May 9, 1950     O. PHIPPS     2,507,222

MULTIPLE EDGE PERCUSSION BIT

Filed Aug. 19, 1946

INVENTOR:
ORVILLE PHIPPS
BY
ATTORNEY

Patented May 9, 1950

2,507,222

UNITED STATES PATENT OFFICE 2,507,222

MULTIPLE EDGE PERCUSSION BIT

Orville Phipps, Adams County, near Denver, Colo.

Application August 19, 1946, Serial No. 691,513

1 Claim. (Cl. 255—64)

This invention relates to percussion-reactive drill bits effective for the development of cylindrical holes or bores in natural soils, rocks, masonry, concrete, and analogous refractory materials, and has as an object to provide an improved such drill bit of "star" or multiple cutting edge type.

A further object of the invention is to provide an improved percussion-type, multiple cutting edge drill bit adapted for use with conventional drill stock and actuating equipment.

A further object of the invention is to provide an improved percussion-type, multiple cutting edge drill bit arranged for self-guidance in the development of a smoothly-cylindrical bore of maintained axial alignment.

A further object of the invention is to provide an improved construction, arrangement, and association of cutting edges constituting the working face of a percussion-type, multiple cutting edge drill bit.

A further object of the invention is to provide an improved construction and association of cutting edges susceptible of specific arrangement in various numbers and patterns to constitute the working face of a percussion-type, multiple cutting edge drill bit.

A further object of the invention is to provide an improved percussion-type, multiple cutting edge drill bit that is relatively simple and inexpensive of manufacture, remarkably durable and long-wearing in use, efficient in operation, adaptable to either fixed or removable and replaceable association with the full range of conventional drill stocks, convenient of reconditioning in the field, repetitiously rehabilitatable to an unusually long useful life without the need for heating, forging, and tempering, and susceptible of manufacture in a range of sizes to meet all practical requirements.

Figure 1:
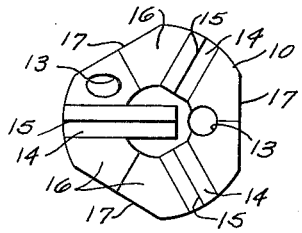
Figure 2:
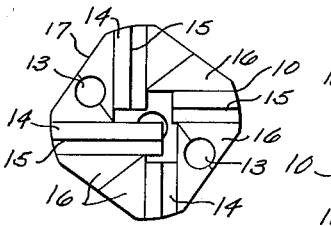
Figure 3:
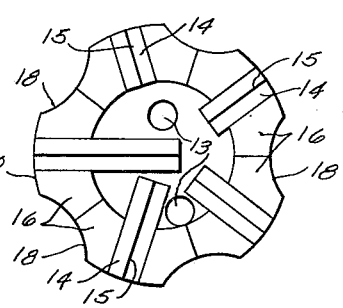
Figure 4:
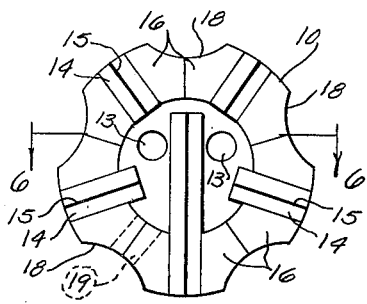
Figure 5:
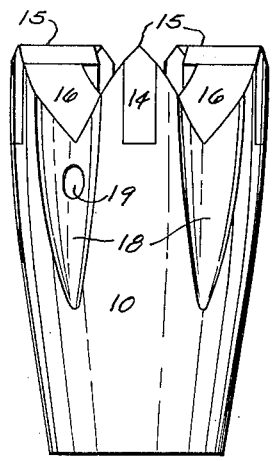
Figure 6:
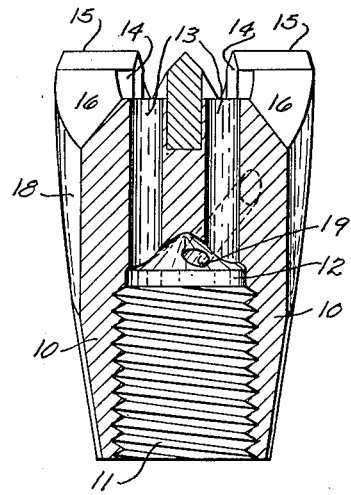

With the foregoing and other objects in view, my invention consists in the construction, arrangement, and combination of elements hereinafter set forth, pointed out in my claim, and illustrated by the accompanying drawing, in which:

Figure 1 is a plan view of the working face of a three cutting edge drill bit incorporating the principles of the invention. Figure 2 is a view similar to Figure 1 illustrating a four cutting edge embodiment of the invention. Figure 3 is a plan view of yet another embodiment of the invention wherein the working face is equipped with five cutting edges. Figure 4 is a view similar to Figure 3 showing an alternative arrangement of the five cutting edges of the latter figure. Figure 5 is a side elevation of a preferred construction of the complete drill bit equipped with a working face as shown in Figure 4. Figure 6 is a longitudinal section through the construction according to Figure 5, taken substantially of the indicated line 6—6 of Figure 4.

In the construction of the improvement as shown, the numeral 10 designates the major portion, or body, of a drill bit, illustrated in this instance as arranged for threaded removable and replaceable association with a length of drill stock (not shown), which body 10 is an integral, homogeneous block of suitably tough, shock-resistant material, such as tool steel, formed, as by forging, rolling, or pressing, to approximate a right frustum of a relatively sharp cone. The greater base area of the body 10 is developed as the working face of the drill bit and hence has a diameter corresponding with that desired for the hole or bore to be drilled, while the lesser base area of the body, adapted to coact with and to receive and transmit percussion from a drill stock assembly, is exteriorly sized to conform with the diameter and outline of its drill stock mounting. The arcuate exterior surface of the body 10 is, save for the interruptions hereinafter specified, smoothly cylindrical, or approximately so, for a short distance from its greater base plane toward the lesser base plane, and then smoothly conical from the termination of said cylindrical portion and to said lesser base, it being understood, of course, that the said cylindrical and conical body portions may merge by means of a longitudinally curved area, as shown, rather than through a definitely-defined angle.

An axial bore is formed in and opens through the lesser base end of the body 10 to receive and accommodate the mounting tenon or stud wherewith the drill stock is provided, and in Figure 6 said bore is shown as provided with internal threads 11 for coaction with a threaded drill stock stud or tenon; the contemplation of the invention, however, embracing any and every commonly-employed manner of operatively associating a drill bit with and as a terminal extension on a percussion drill line or string, whether by welding, driven friction fit, interengagement of threads, or otherwise. At its inner end, the said axial bore is extended somewhat beyond the length essential for cooperation with the drill stock to provide a chamber 12 for the reception and distribution of cooling and scavenging liquid thereto delivered, in a customary manner, through the drill line or string, and flow passages 13, in any desired number and convenient arrangement, connect between the chamber 12 and drill bit working face to direct liquid supplied to said chamber to and for flow across the said face during operation of the tool.

At its working face end, the greater base area of the body 10 is centrally and axially recessed a moderate distance to provide an annular, axially-projecting, marginal flange which mounts and fixedly supports the separate, inserted, cutting edges of the improvement, the end projection of said flange being variously ground or cut away from between the inserted cutting edges according to the number and consequent pattern of said edges. The cutting edges of the improvement are formed on and along projecting margins of blocks 14, generally rectangular in form, fitted, seated, and permanently secured by welding in slots formed for their reception in and opening axially and circumferentially through the body 10 greater end and annular flange. The blocks 14 are of a composition different from that of the body 10 and are characterized by extreme hardness, high resistance to abrasion, toughness such as inhibits chipping and faulting, amenability to welding, and capability of being ground to present true edges and sharp corners, and, while susceptible of development from various alloys having the properties above noted, are preferably of a non-ferrous alloy containing tungsten, titanium, tantalum, nickel and cobalt which, in proportions productive of the recited properties, has proved effective in practical use. Whatever may be their particular composition or the specific number thereof employed in a given instance, the blocks 14 associated with and to complete an individual drill bit unit are identical as to material and conveniently alike in dimensions except for a variation in length measured parallel to the block cutting edge, each of said blocks being relatively deep axially of the body 10, relatively narrow in thickness perpendicular to its depth, formed with a flat, inner end adapted to base solidly against a slot end perpendicular to the body 10 axis, and an exterior or projecting end margin ground or otherwise worked to present a pair of outwardly-converging, identical, flat faces intersecting in a cutting edge line 15 parallel to the block inner end plane, the convergence angle of said block inclined faces varying, as is customary practice, according to the nature of the material to be drilled. Blocks 14 formed and constructed as above described having been seated and welded in the desired number in the slots of a body 10 provided for their reception so as to dispose their edges 15 in a common plane perpendicular to the body axis, the body annular flange and greater end material between adjacent blocks 14 is symmetrically ground or cut away to the inclination of the adjacent block inclined faces and to form relief notches 16 converging axially and toward the lesser end of the body 10 between each pair of juxtaposed blocks, so that each block 14 becomes at its cutting edge the apex and working margin of a symmetrical tooth projecting axially from the body 10.

As typified by the various views of the drawing, the number and specific arrangement of blocks 14, and cutting edges 15, comprised in a given drill bit may vary widely to meet variations of drill bore size and character of material encountered in actual drilling operations without variation in or sacrifice of the features and properties peculiar to the improvement. Whatever be the number and specific arrangement of blocks 14 in a given bit, the cutting edges 15 of said blocks lie in or define a working face plane perpendicular to the body 10 axis, said blocks are invariably seated with their depth dimension parallel to the body axis, one of said blocks in each arrangement has a length, and consequently a corresponding cutting edge length, exceeding the radius of the bit working face, whereby the inner end of said block cutting edge is extended through or past the tool and drill bore center, the remaining blocks of the assembly have cutting edge lengths, either uniform or variable, less than the working face radius, the said blocks are uniformly spaced apart angularly of the working face, and outer edge margins of said blocks open throughout the block depth through the cylindrical wall portion of the body greater end and are smoothly worked to conform therewith. As represented by the drawing, it is convenient to arrange the blocks 14 of a given assembly so that their cutting edges 15 are radial of the tool working face, and such may well be the more usual construction of the improved tool, but in is to be understood that the invention contemplates and embraces non-radial disposition of the said cutting edges, such, for example, as an ararngement wherein said cutting edges are tangential to a circle smaller than and concentric with the tool working face, as in Figure 2.

Adequate for the effective drilling of a bore of small size, or perhaps one of larger size through relatively penetrable material, the invention in its simplest form presents three cutting edges on blocks 14 arranged as shown in Figure 1, wherein one of said blocks exceeds the other two in length and extends past the center of the working face while the remaining blocks are alike in length and fall short of closing against the longer block, which arrangement provides for cutting edge reaction against the entire area of the drill bore bottom, as the bit is rotated and actuated within said bore, while wholly eliminating the impacting and non-cutting center common to "star" drills whereof the cutting edges converge to meet centrally of the tool. The working face axial recess of the Figure 1 arrangement serves as a relief against the compacting of drillings centrally of the working face and said recess is intersected, at least partially, by one of the passages 13 to insure adequate flushing of drilled material away from and with cooling effect on the tool cutting edges. When the three-edge pattern is employed, simple dubbing away of segments of the body 10 greater end cylindrical portion between adjacent blocks 14 and to planes 17 parallel to the body axis is sufficient to provide relief channels between the operating tool and the bore wall through which liquid and drillings may uprise with scavenging effect in the usual manner, spaced arcs of the cylindrical portion original outline, each embracing and being intersected by a block 14 outer end, being preserved to effectively maintain the bore size and uniformity of diameter and to guide the bit in the preservation of bore axial alignment.

A somewhat more effective concentration of cutting edge length relative to working face area is illustrated by Figure 2, wherein four blocks 14, of progressively decreasing lengths, are arranged with their correspondingly dimensioned cutting edges 15 tangential to a small circle concentric with the working face and with their inner ends spaced away from the associated blocks to facilitate regrinding and sharpening of the block cutting edges and to open outflow passages from the working face axial recess between and about the block inner ends, the longest of the blocks 14 extending past and beyond the working face center in the manner and for the purpose previously set forth. With the four-edge pattern, adequate relief channels for scavenging outflow from the bore result from the dubbing away of exterior cylindrical segments between adjacent blocks 14 and to planes 17 parallel to the body axis, as described in relation to the showing of Figure 1.

For the effective drilling of large-size bores, and for the efficient penetration of the more refractory materials, a cutting edge arrangement and pattern similar to the showing of Figures 3 and 4 may be found advantageous. Both of the last-mentioned views present a unit equipped with five, uniformly-spaced, separate blocks 14 whereof the cutting edges are disposed radially and the block outer margins intersect and merge with the body 10 cylindrical portion outer wall. In Figure 3, the block cutting edge lengths progressively decrease from a maximum slightly exceeding the working face radius to a minimum equalling the radial thickness of the axially-extending, annular flange, while in Figure 4 the maximum length edge almost, but not quite, closes across the working face axial recess, and the remaining four edges are paired as to length, one pair having individual length equalling the annular flange radial thickness and the other pair having slightly greater individual lengths, the cutting edge patterns and arrangements of the two views being operatively alternative. With more than four cutting edges on the working face of a bit, the diminished arc between adjacent edges is inadequate to provide suitable relief channels when dubbed away to a flat plane, and it hence becomes expedient to form the requisite relief channels as inwardly-arcuate flutings 18 longitudinally of the body 10 between the adjacent blocks 14 and axially parallel with the body axis, so that the bases of said flutings rather deeply intersect the greater end of the body and merge into the body circular contour short of the lesser end thereof. To supplement flow of liquid through the passages 13 to and across the tool working face, and to direct some flow to the drill bore wall for enhanced scavenging effect, passages 19 may be formed in the body 10 to connect between the chamber 12 and one or more of the relief channels constituted by the planes 17 or flutings 18.

As is readily apparent, the improved drill bit of the instant invention presents certain operative advantages of material significance from the standpoint of drilling speed, economy, and efficiency. The nature and arrangements of the insert blocks 14 are productive of a fast-cutting, long-wearing, non-impeded, working face susceptible of rapid, convenient, and repetitious reconditioning in the field and effective in use for the development of a straight, uniformly-cylindrical drill bore, the outer end margins and corners of the inserts absorbing without appreciable distortion the wear which otherwise would deform and abrade away the original contours and dimensions of the tool. The body 10 of the assembly being of readily-workable material, production of the improvement is entirely feasible at reasonable cost, the shapes of the extremely hard alloy insert blocks being easily realized through simple grinding and requiring no onerous and expensive machining, while the body portion is simple of conventional manufacture in whatever form, size and adaptation may be desired.

Since many changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

In a percussion-type drill bit having a generally frusto-conical body of readily-workable metal adapted for mounted association with and as an axial terminal extension on a length of drill stock and a generally-circular working face area at the free end and perpendicular to the axis of said body, a recess centrally intersecting said face axially of said body to define a continuous, integral flange marginally coincident with and projecting axially from the body free end, non-communicating, angular slots of unequal lengths interrupting said flange and the floor of said recess in angularly-spaced relation to open through the exterior flange wall and axially-projected flange margin, the slot of maximum length exceeding the half dimension of said working face and the slot of minimum length intersecting the interior as well as the exterior flange wall, an insert block of extremely-hard, wear-resistant alloy material fixed in and to fill the length of each said slot with the block outer and conformed to the flange exterior surface, whereby inner ends of said blocks are juxtaposed in spaced relationship, a cutting edge on and coextensive in length with the exposed long margin of each of said blocks, said edges determining a common plane perpendicular to the body axis, relief channels longitudinally interrupting the body exterior surface between outer ends of adjacent blocks, relief notches in said flange between adjacent insert blocks converging axially of said body away from said cutting edges as passages connecting each of said channels with said recess, and flow passages operatively traversing said body for the delivery of fluid to said recess.

ORVILLE PHIPPS.

REFERENCES CITED

The following references are of record in the file of this patent:

UNITED STATES PATENTS

| Number | Name | Date |
|---|---|---|
| 903,936 | Wilson et al. | Nov. 17, 1908 |
| 2,166,478 | Riblet | July 18, 1939 |
| 2,368,512 | Zimmerman | Jan. 30, 1945 |

FOREIGN PATENTS

| Number | Country | Date |
|---|---|---|
| 374,213 | Italy | Aug. 19, 1939 |